United States Patent
Khay-Ibbat et al.

(10) Patent No.: US 9,635,596 B2
(45) Date of Patent: Apr. 25, 2017

(54) TRANSITIONING A VIDEO CALL BETWEEN NETWORKS

(71) Applicant: Apple Inc., Cupertino, CA (US)

(72) Inventors: Samy Khay-Ibbat, San Francisco, CA (US); Sarma V. Vangala, San Jose, CA (US); Paul V. Flynn, Menlo Park, CA (US); Wen Zhao, San Jose, CA (US); Sreevalsan Vallath, Dublin, CA (US); Navid Damji, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/944,156

(22) Filed: Nov. 17, 2015

(65) Prior Publication Data

US 2016/0073317 A1  Mar. 10, 2016

Related U.S. Application Data (63) Continuation of application No. 14/109,665, filed on Dec. 17, 2013, now Pat. No. 9,215,639.

(60) Provisional application No. 61/745,454, filed on Dec. 21, 2012.

(51) Int. Cl.
*H04W 36/30* (2009.01)
*H04N 7/14* (2006.01)
*H04W 36/14* (2009.01)

(52) U.S. Cl.
CPC .......... *H04W 36/30* (2013.01); *H04N 7/147* (2013.01); *H04N 7/148* (2013.01); *H04W 36/14* (2013.01)

(58) Field of Classification Search
CPC ........ H04N 7/147; H04N 7/148; H04W 36/14
USPC ..... 348/14.02; 370/242, 252, 331, 332, 328; 455/444, 417, 436; 725/133; 379/87, 379/88.13; 709/208; 713/155
See application file for complete search history.

(56) References Cited

U.S. PATENT DOCUMENTS

| | | | |
|---|---|---|---|
| 7,796,605 B2 | 9/2010 | Pecen et al. | |
| 8,245,266 B2 * | 8/2012 | Jefremov | H04N 7/148 348/14.01 |
| 8,565,772 B2 | 10/2013 | Bae et al. | |
| 8,737,325 B2 | 5/2014 | Ergen | |
| 8,830,844 B2 * | 9/2014 | Mathias | H04W 36/30 370/242 |
| 8,890,921 B2 * | 11/2014 | Rawat | H04N 7/14 348/14.02 |

(Continued)

*Primary Examiner* — Gerald Gauthier
(74) *Attorney, Agent, or Firm* — Downey Brand LLP (57) ABSTRACT

A method for transitioning a video call is provided. The method can include a wireless communication device participating in a video call with a remote communication device via a first video call session established over a connection between the wireless communication device and a first cellular network. The video call can include a packet switched video stream carried over a first bearer and an audio stream carried over a second bearer. The method can further include the wireless communication device determining a degradation in a connection quality for the first cellular network; transitioning to a legacy cellular network having a circuit switched domain in response to the degradation in connection quality for the first cellular network; establishing a second video call session on the legacy cellular network; and using the second video call session to continue the video call on the legacy cellular network.

20 Claims, 6 Drawing Sheets

(56) References Cited

U.S. PATENT DOCUMENTS

| | | |
|---|---|---|
| 8,908,507 B2 | 12/2014 | Kovvali et al. |
| 8,923,861 B2 | 12/2014 | Cili et al. |
| 8,929,336 B2 | 1/2015 | Rydnell et al. |
| 8,971,894 B2 | 3/2015 | Sane et al. |
| 9,008,023 B2 | 4/2015 | Khay-Ibbat |
| 2003/0174670 A1* | 9/2003 | Mar .................. H04L 29/06027 370/328 |
| 2005/0180338 A1* | 8/2005 | Pirila ............... H04L 29/06027 370/252 |
| 2007/0263798 A1* | 11/2007 | Dewing ............ H04L 29/06027 379/88.13 |
| 2008/0037473 A1* | 2/2008 | Brown ................ H04W 76/025 370/332 |
| 2009/0075657 A1* | 3/2009 | Klatt ..................... H04W 28/08 455/436 |
| 2010/0123575 A1 | 5/2010 | Mittal et al. |
| 2011/0021183 A1* | 1/2011 | Garcia Cabezas .... H04W 36/32 455/417 |
| 2011/0188471 A1 | 8/2011 | Kim |
| 2012/0044868 A1 | 2/2012 | Faccin et al. |
| 2012/0087339 A1* | 4/2012 | Wu .................. H04W 36/0022 370/331 |
| 2012/0115487 A1 | 5/2012 | Josso |
| 2012/0212569 A1 | 8/2012 | Lei |
| 2013/0021933 A1 | 1/2013 | Kovvali et al. |
| 2013/0044613 A1 | 2/2013 | Edara et al. |
| 2013/0063540 A1* | 3/2013 | Zisimopoulos ... H04W 36/0022 348/14.02 |
| 2013/0188607 A1 | 7/2013 | Mutikainen |
| 2013/0215822 A1 | 8/2013 | Worrall et al. |
| 2013/0223335 A1 | 8/2013 | Kwag et al. |
| 2013/0232335 A1* | 9/2013 | King ..................... H04L 63/062 713/155 |
| 2013/0244655 A1 | 9/2013 | Pica et al. |
| 2013/0250032 A1* | 9/2013 | Andr-Jonsson ... H04W 36/0022 348/14.02 |
| 2013/0279474 A1* | 10/2013 | Dimou .................. H04W 36/16 370/331 |
| 2013/0325995 A1* | 12/2013 | Ispas ...................... H04L 12/12 709/208 |
| 2013/0343347 A1 | 12/2013 | Andre-Jonsson et al. |
| 2014/0045505 A1* | 2/2014 | Henry ............... H04W 36/0061 455/444 |
| 2014/0064156 A1 | 3/2014 | Paladugu et al. |
| 2014/0071888 A1 | 3/2014 | Khay-Ibbat |
| 2014/0126544 A1 | 5/2014 | Khay-Ibbat et al. |
| 2014/0176659 A1 | 6/2014 | Khay-Ibbat et al. |
| 2014/0176660 A1 | 6/2014 | Khay-Ibbat et al. |
| 2014/0219246 A1 | 8/2014 | Khay-Ibbat et al. |
| 2014/0269624 A1 | 9/2014 | Khay-Ibbat et al. |
| 2014/0293961 A1 | 10/2014 | Khay-Ibbat et al. |
| 2015/0172032 A1 | 6/2015 | Khay-Ibbat et al. |

* cited by examiner

TRANSITIONING A VIDEO CALL BETWEEN NETWORKS

CROSS-REFERENCE TO RELATED APPLICATION

This application is a continuation of U.S. patent application Ser. No. 14/109,665, filed Dec. 17, 2013, which claims the benefit of U.S. Provisional Patent Application No. 61/745,454, filed Dec. 21, 2012, both of which are incorporated by reference herein in their entireties.

FIELD

The described embodiments relate generally to wireless communications. More particularly, the present embodiments relate to transitioning a video call between networks.

BACKGROUND

Many modern wireless communication devices include cameras enabling the devices to support video calls, which can include both video and audio. These video calls can be established and supported over modern cellular networks, such as Long Term Evolution (LTE) networks, which can support packet switched data at a sufficient rate to support streaming video. LTE networks, which can support faster data rates than legacy cellular technologies, are being developed and deployed. However, LTE coverage is not yet universal and, as such, LTE networks are being co-deployed in overlapping regions with legacy cellular networks and wireless communication devices may transition between cellular radio access technologies (RATs) as a result of moving in and out of LTE coverage due to device mobility.

In an instance in which a wireless communication device has an active session, such as an active video call, when transitioning between networks it can be important from a user perspective to transition the session without dropping the session. However, some networks may not support inter-network session transitions. Thus, for example, active video calls can be dropped during some network transitions, resulting in a negative user experience.

SUMMARY

Some example embodiments disclosed herein provide for transitioning a video call between networks. More particularly, some example embodiments provide a wireless communication device configured to proactively establish a new video call session in response to transitioning between networks which do not support network coordinated handover of the video call session so that a video call can be continued on the new network without the user having to manually initiate reestablishment of the video call. As such, while a user may notice a relatively brief pause in the video call, the user may not be aware of a call drop, and does not have to take action to proactively reestablish the video call following network transition. Some embodiments may be particularly advantageous when a device is transitioning from a network supporting packet switched (PS) transmission of voice, such as some LTE networks, to a legacy cellular network, such as a third generation (3G) network, having a circuit switched (CS) domain in instances in which network coordinated handover of a video call session is not supported by the LTE network and/or by the legacy cellular network.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some example embodiments disclosed herein provide for transitioning a video call between networks. In this regard, some example embodiments provide a wireless communication device configured to proactively establish a new video call session in response to transitioning between networks so that a video call can be continued on the new network, even when network coordinated handover of the video call from the prior network to the new network is not supported. In accordance with some such example embodiments, a video call application that can be implemented on the wireless communication device and/or on a remote communication device participating in the video call can be configured to transition to the new video call session after the original video call session has been terminated or dropped without alerting the user that the original video call session has been dropped or that a new video call session has been established. As such, while a user may notice a relatively brief pause in the video call, the user may not be aware of a call drop, and does not have to take action to proactively reestablish the video call following network transition. Such example embodiments accordingly provide for an improved user experience.

These and other embodiments are discussed below with reference to FIGS. 1-6. However, those skilled in the art will readily appreciate that the detailed description given herein with respect to these Figures is for explanatory purposes only and should not be construed as limiting.

Figure 1:
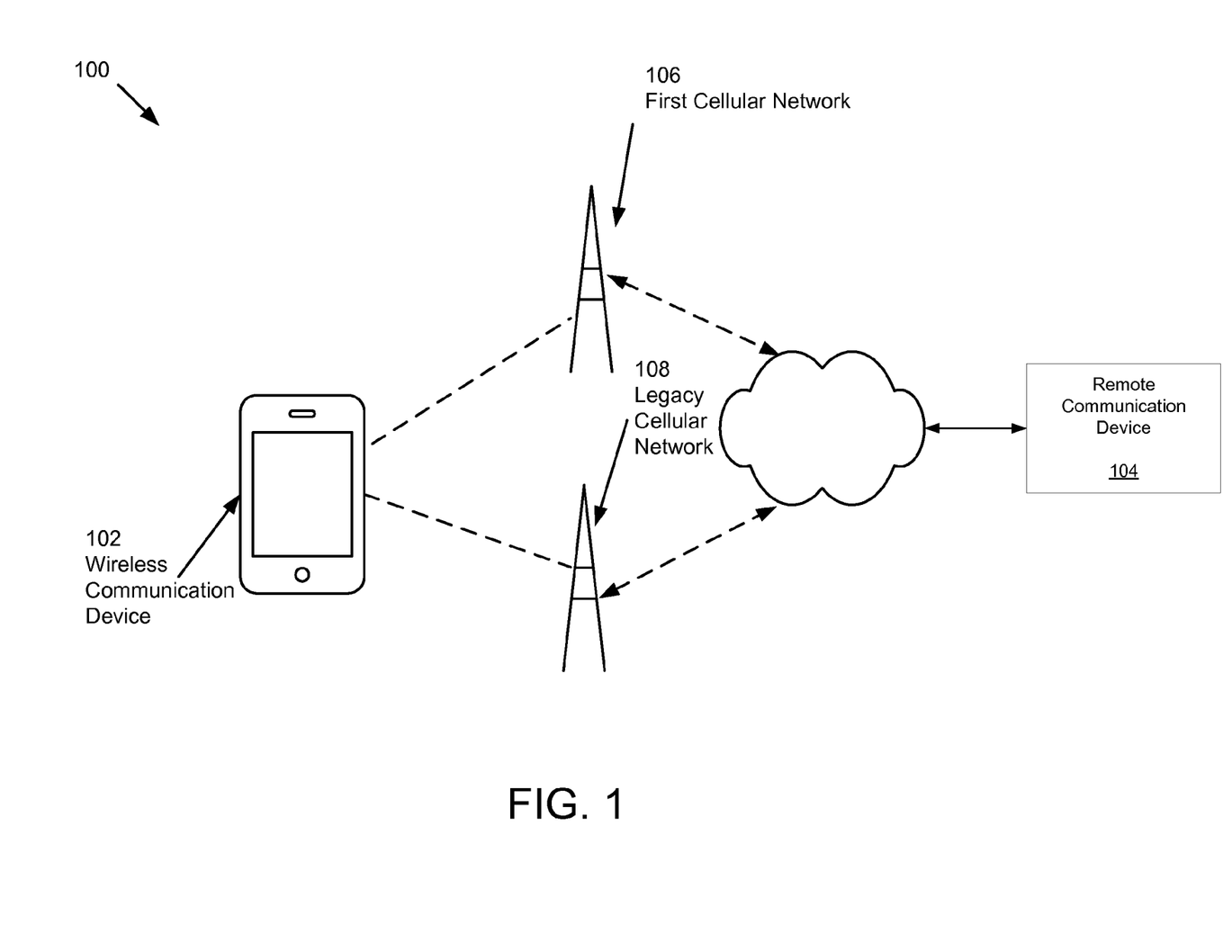
FIG. 1 illustrates a wireless communication system in accordance with some example embodiments.

FIG. 1 illustrates an example wireless communication system 100 in accordance with some example embodiments. The system 100 can include a wireless communication device 102, which can establish a video call with a remote communication device 104. By way of non-limiting example, the wireless communication device 102 can be a cellular phone, such as a smart phone device, a tablet computing device, a laptop computing device, or other computing device that can be configured for compatibility with multiple cellular RATs. In some example embodiments, the wireless communication device 102 can be configured to connect to both a first cellular network 106 and a second cellular network, such as legacy cellular network 108.

The remote communication device 104 can be embodied as any device that can be configured to engage in a video call over a network connection, including, for example, a video phone, a cellular phone, a tablet computing device, a laptop computing device, a desktop computer, or other computing device. In some example embodiments, the remote communication device 104 can be embodied as a second wireless communication device 102. The remote communication device 104 can be configured to use any access technology to access a network to engage in a video call and/or other communication session with the wireless communication device 102. By way of non-limiting example, the remote communication device 104 of some example embodiments may be configured to use a cellular technology, WLAN access technology, and/or other wireless communications technology to access a network and engage in a communication session with the wireless communication device 102. As a further example, in some embodiments, the remote communication device 104 may use a wireline connection, such as a digital subscriber line (DSL), cable internet, and/or other wireline network connection and/or other wireless communications technology to access a network and engage in a communication session with the wireless communication device 102

The first cellular network 106 can, for example, be a network that can support packet switched (PS) data transmission for a video call, including PS video data transmission and voice over Internet Protocol (VoIP) transmission and/or other PS technique for transmission of audio data for the video call. As a non-limiting example, the first cellular network 106 can be a fourth generation (4G) cellular network, such as a 4G network implementing an LTE technology, such as an LTE network, an LTE-Advanced (LTE-A) network, and/or the like, which can support both packet switched video data transmission and voice over LTE (VoLTE) transmission of audio data for a video call. However, it will be appreciated that the first cellular network 106 of some embodiments can implement some other existing and/or future-developed cellular networking technology, such as various fifth generation (5G) and beyond cellular networking technologies, capable of supporting PS data transmission of both video and audio data for a video call.

The legacy cellular network 108 can be any network having a circuit switched (CS) domain. By way of non-limiting example, the legacy cellular network 108 can be a third generation (3G) network, such as a Wideband Code Division Multiple Access (WCDMA) or other Universal Mobile Telecommunications System (UMTS) network, such as a Time Division Synchronous Code Division Multiple Access (TD-SCDMA) network. As a further example, the legacy cellular network 108 can be a CDMA2000 network, such as a 1×RTT network, or other network standardized by the Third Generation Partnership Project 2 (3GPP2) that supports a CS domain. As another example, the legacy cellular network can be a second generation (2G) network such as a Global System for Mobile Communications (GSM) network.

As will be described further herein below, the wireless communication device 102 and remote communication device 104 can have an established video call over the first cellular network 106. The video call can, for example, be supported by a video call application, such as, by way of non-limiting example, Apple® FaceTime®, which can be implemented on the wireless communication device 102 and/or on the remote communication device 104. A connection quality of a connection between the wireless communication device 102 and the first cellular network 106 can degrade, such as due to mobility of the wireless communication device 102. As a result of the degradation in connection quality, the wireless communication device 102 can transition to the legacy cellular network 108. For example, degradation of the connection quality may reach a point at which the connection quality is less than a threshold connection quality that may be defined for measurement event reporting, reselection, handover, and/or other action that may result in a wireless communication device transitioning between networks. In accordance with some example embodiments described further herein below, a new video call session can be established on the legacy cellular network 108 so that the video call can be continued after the wireless communication device 102 has transitioned to the legacy cellular network 108.

Figure 2:
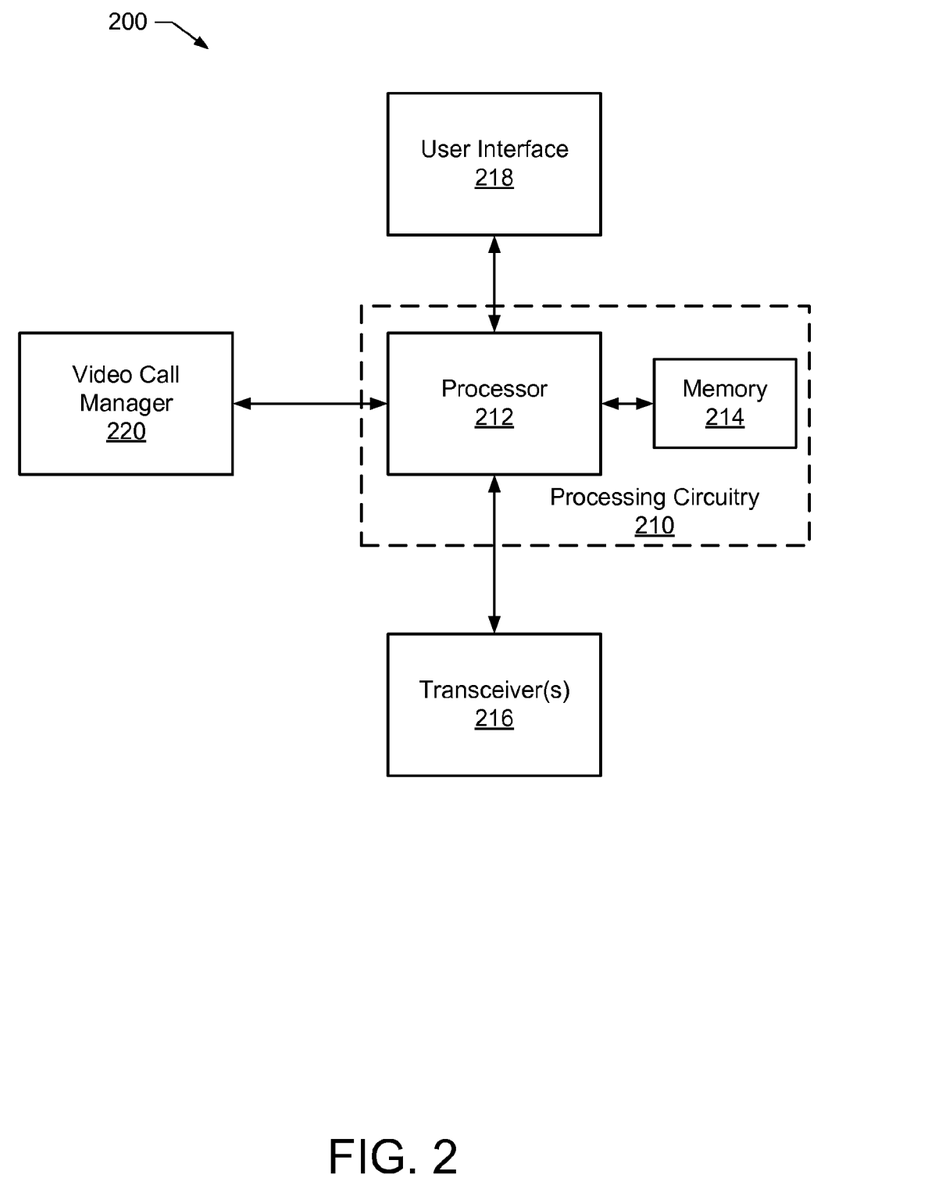
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 and/or on a remote communication device 104 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 (e.g., of the wireless communication device 102) in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to operate over the first cellular network 106 and/or legacy cellular network 108.

In some example embodiments, the processing circuitry 210 can include a processor 212 and, in some embodiments, such as that illustrated in FIG. 2, can further include memory 214. The processing circuitry 210 can be in communication with or otherwise control a transceiver(s) 216, user interface 218, and/or video call manager 220.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. In embodiments including a plurality of processors, the plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver(s) 216, user interface 218, or video call manager 220 via a bus (or buses) for passing information among components of the apparatus 200.

The apparatus 200 can further include transceiver(s) 216. The transceiver(s) 216 can enable the apparatus 200 to send wireless signals to and receive signals from one or more cellular networks, such as the first cellular network 106 and/or the legacy cellular network 108. As such, the transceiver(s) 216 can be configured to support any type of cellular or other wireless communication technology that may be implemented by the first cellular network 106 and/or the legacy cellular network 108. In some example embodiments, the transceiver(s) 216 can include a single transceiver configured to enable a device, such as the wireless communication device 102 to connect to both the first cellular network 106 and the legacy cellular network 108. Alternatively, in some example embodiments, the transceiver(s) 216 can include a first transceiver configured to enable a device to connect to the first cellular network 106 and a second transceiver configured to enable the wireless communication device 102 to connect to the legacy cellular network 108.

The apparatus 200 can additionally include a user interface 218. The user interface 218 can be in communication with the processor 212 to receive an indication of a user input and/or to provide an audible, visual, mechanical, or other output to a user. As such, the user interface 218 may include, for example, a keyboard, a mouse, a joystick, a display, a touch screen display, a microphone, a speaker, a camera, and/or other input/output mechanisms. For example, the user interface 218 can include a display on which video for a video call can be displayed. As another example, the user interface 218 can include a camera configured to capture video for a video call.

The apparatus 200 can further include a video call manager 220. The video call manager 220 can be embodied as various means, such as circuitry, hardware, a computer program product including a computer readable medium (for example, the memory 214) storing computer readable program instructions that are executable by a processing device (for example, the processor 212), or some combination thereof. In some embodiments, the processor 212 (or the processing circuitry 210) can include, or otherwise control the video call manager 220. The video call manager 220 can be configured to manage or otherwise support transitioning a video call between networks in accordance with one or more example embodiments.

Figure 3:
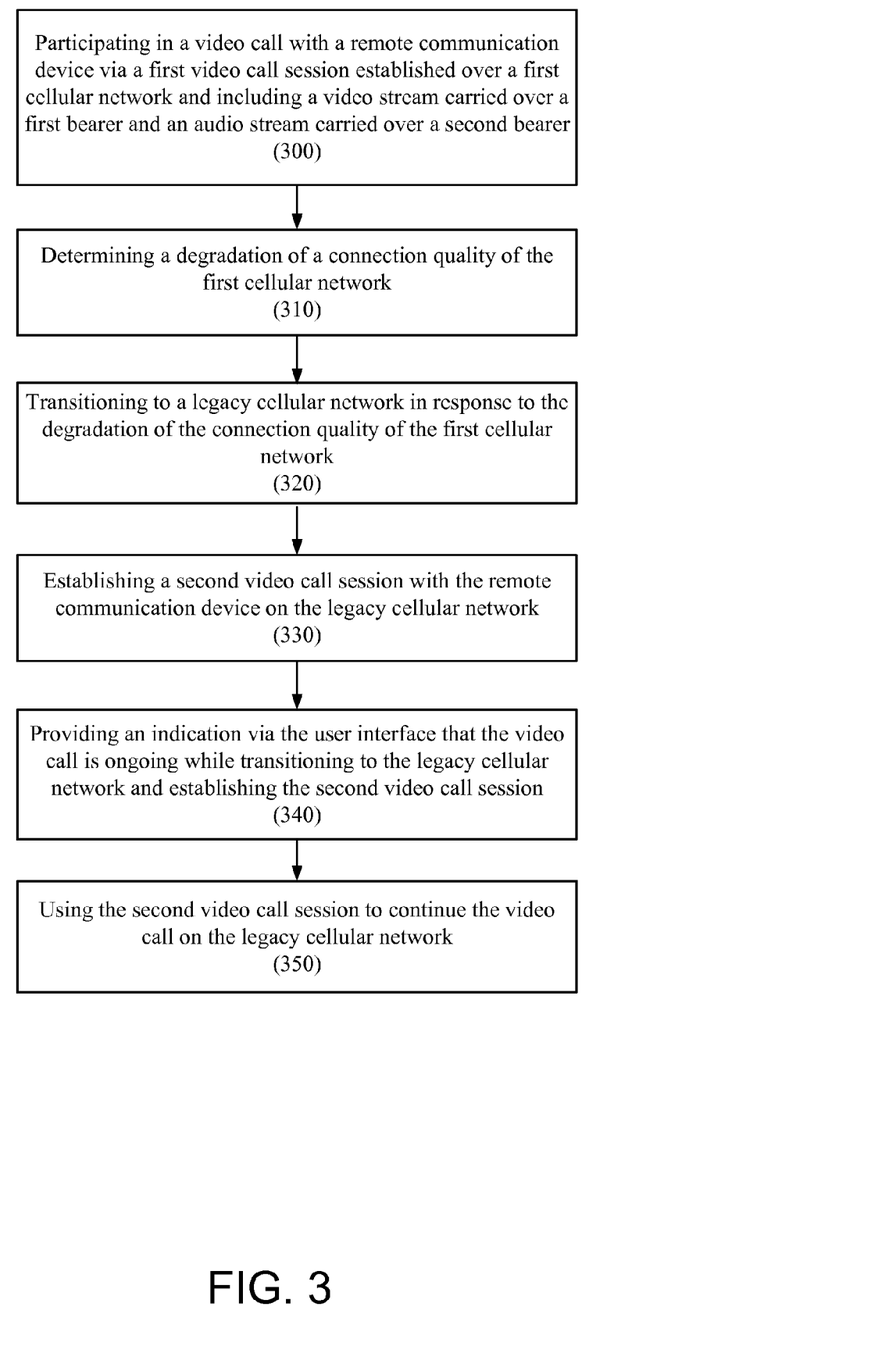
FIG. 3 illustrates a flowchart of operations that can be performed by a wireless communication device in accordance with an example method for transitioning a video call to a legacy cellular network according to some example embodiments.

FIG. 3 illustrates a flowchart of operations that can be performed by a wireless communication device 102 in accordance with an example method for transitioning a video call to the legacy cellular network 108 according to some example embodiments. One or more of processing circuitry 210, processor 212, memory 214, transceiver(s) 216, user interface 218, or video call manager 220 can, for example, provide means for performing the operations illustrated in and described with respect to FIG. 3.

Operation 300 can include the wireless communication device 102 participating in an ongoing video call with the remote communication device 104 via a first video call session while connected to the first cellular network 106. The first video call session may have been established over the first cellular network 106. The video call can, for example, be supported by a video call application, such as, by way of non-limiting example, Apple® FaceTime®, which can be implemented on the wireless communication device 102 and/or on the remote communication device 104. The video call can include a video stream (e.g., a PS video stream) that can be carried over a first bearer on the first cellular network 106 and an audio stream (e.g., a PS audio stream) that can be carried over a second bearer on the first cellular network 106. The bearer carrying the audio stream can, for example, be a QCI1 bearer or other bearer, which can provide a guaranteed quality of service for supporting PS voice transmission. In some example embodiments in which the first cellular network 106 is an LTE network (e.g., a network implementing LTE, LTE-A, and/or other LTE technology) that supports VoLTE, the audio stream can be a VoLTE audio stream and the bearer carrying the audio stream can be a VoLTE bearer. For example, in some scenarios, such as embodiments in which both the wireless communication device 102 and the remote communication device 104 are connected to an LTE network, the audio stream can be provided via end-to-end VoLTE. In some such embodiments in which the audio stream is a VoLTE audio stream, the video call can comprise a VoLTE call with video for the video call being carried by a separate bearer and added on top of the VoLTE call.

Operation 310 can include the wireless communication device 102 determining a degradation of a connection quality of the first cellular network 106. For example, in some embodiments, determination of the degradation can include determining that a connection quality for the first cellular network 106 has dropped below a threshold connection quality. In this regard, the threshold connection quality can be a threshold, such as can be defined by the wireless communication device 102 and/or by the first cellular network 106, for measurement event reporting, reselection, handover, and/or other action that may trigger the wireless communication device 102 to transition between networks.

The determination of operation 310 can be made based at least in part on measurements of the connection to the first cellular network 106 that can be made by the wireless communication device 102. The measured connection quality can be any measurable connection quality metric that can be indicative of a connection quality including, for example, received signal strength indicator (RSSI), reference signal received power (RSRP), reference signal received quality (RSRQ), and/or the like.

The wireless communication device 102 and/or the first cellular network 106 can decide to transition the wireless communication device 102 to the legacy cellular network 108 in response to the degradation of the connection quality of the first cellular network 106. Operation 320 can accordingly include the wireless communication device 102 transitioning to the legacy cellular network 108 in response to the degradation in connection quality.

In some embodiments, the first cellular network 106 may not support a mechanism, such as single radio voice call continuity (SRVCC), for transferring VoLTE and/or other PS voice stream to the legacy cellular network 108. Accordingly, network coordinated transitioning (e.g., handover) of the ongoing video call from the first cellular network 106 to the legacy cellular network 108 may not be supported by the first cellular network 106. As such, the original video call session established on the first cellular network 106 can be dropped by the network and the remote communication device 104 can receive a session initiation protocol (SIP) BYE message as a result of the wireless communication device 102 transitioning to the legacy cellular network 108.

The wireless communication device 102 of some example embodiments can be configured to take action to quickly establish a new replacement video call session that can be presented to a user of the wireless communication device 102 and/or the remote communication device 104 in a manner that can reduce disruption to the user(s) and provide a better user experience. In some example embodiments, the wireless communication device 102 can be configured to send a signal (e.g., an in band signal) and/or other indication to the remote communication device 104 indicating that the wireless communication device 102 is going to transition to a new network prior to performing operation 320. In such example embodiments, a video call application that can be implemented on the remote communication device 104 can receive the signal and can indicate to a user of the remote communication device 104 that the video call is still active even if the connection drops as a result of the wireless communication device 102 transitioning to the legacy cellular network 108 for at least a predefined period of time to allow the wireless communication device 102 to establish a new video call session on the legacy cellular network 108 in a manner that can be transparent to a user of the remote communication device 104.

A user interface, such as a display of the user interface 218, in which the video call can be presented on the wireless communication device 102 can likewise indicate to a user of the wireless communication device 102 that the video call is still ongoing during the network transition process until a new video call session can be established on the legacy cellular network 108. Additionally or alternatively, in some example embodiments, such as that illustrated in and described below with respect to FIG. 5, the wireless communication device 102 and/or remote communication device 104 can implement timers (e.g., guard timers) such that if an air interface connection is dropped by either end, such as can result from the wireless communication device 102 transitioning to the legacy cellular network 108, the video call user interfaces on the wireless communication device 102 and remote communication device 104 can continue to indicate that the video call is active and give the wireless communication device 102 time (e.g., until timer expiry) to complete the transition to the legacy cellular network 108 and establish a new video call session on the legacy cellular network 108 before indicating to an end user(s) that the video call has been dropped.

Operation 330 can include the wireless communication device 102 establishing a second video call session with the remote communication device 104 on the legacy cellular network 108. For example, the second video call session can be automatically established (e.g., in the background) without requiring a user of the wireless communication device 102 to initiate a new session or alerting the user of the call drop via the user interface. In establishing the second video call session, an audio and video path to support the video call can be established between the wireless communication device 102 and remote communication device 104 over the legacy cellular network 108.

As indicated by operation 340, the wireless communication device 102 can provide an indication via the user interface 218 that the video call is ongoing while performing operations 320 and 330. Accordingly, while the user may notice a brief interruption in the video call, the user may not be aware of a call drop, and does not have to take action to proactively reestablish the video call following network transition.

Operation 350 can include the wireless communication device 102 using the second video call session to continue the video call on the legacy cellular network 108. The second video call session can thus essentially replace the original video call session from the first cellular network 106. In this regard, users of the wireless communication device 102 and/or remote communication device 104 may not be alerted that the original call session had been dropped or that a new call session has been initiated. Instead, based on the indication that can be provided attendant to performance of operation 340 in accordance with some example embodiments, the video call can appear to continue to the users as a single video call session with, perhaps, only a brief interruption during the network transition period and the time taken to establish a new video call session. As discussed above and as illustrated in and described below with respect to FIG. 5, guard timers can be used by the wireless communication device 102 and/or remote communication device 104 in some example embodiments in case reestablishment on the legacy cellular network 106 fails so that notification may be provided to the users of a call drop if the second video call session is not successfully established within a defined period of time.

It will be appreciated that the methodology illustrated and described with respect to FIG. 3 can be applied mutatis mutandis to any network transition that can be undergone by a wireless communication device participating in a video call, and thus can be applied in any situation in which network coordinated handover of an ongoing video call is not supported. For example, if a video call is on an LTE network supporting VoLTE with the audio for the call in a dedicated audio stream carried via VoLTE, such as on a QC1 bearer, and the video carried in a separate video stream, and the wireless communication device 102 moves to an LTE network that does not support VoLTE, the methodology described with respect to FIG. 3 can be used to re-establish and continue the video call on the LTE network that does not support VoLTE as a data call. As a further example, if the wireless communication device 102 transitions back to the first cellular network 106 from the legacy cellular network 108, the methodology described with respect to FIG. 3 can be used to re-establish and continue the video call on the first cellular network 106.

Figure 4:
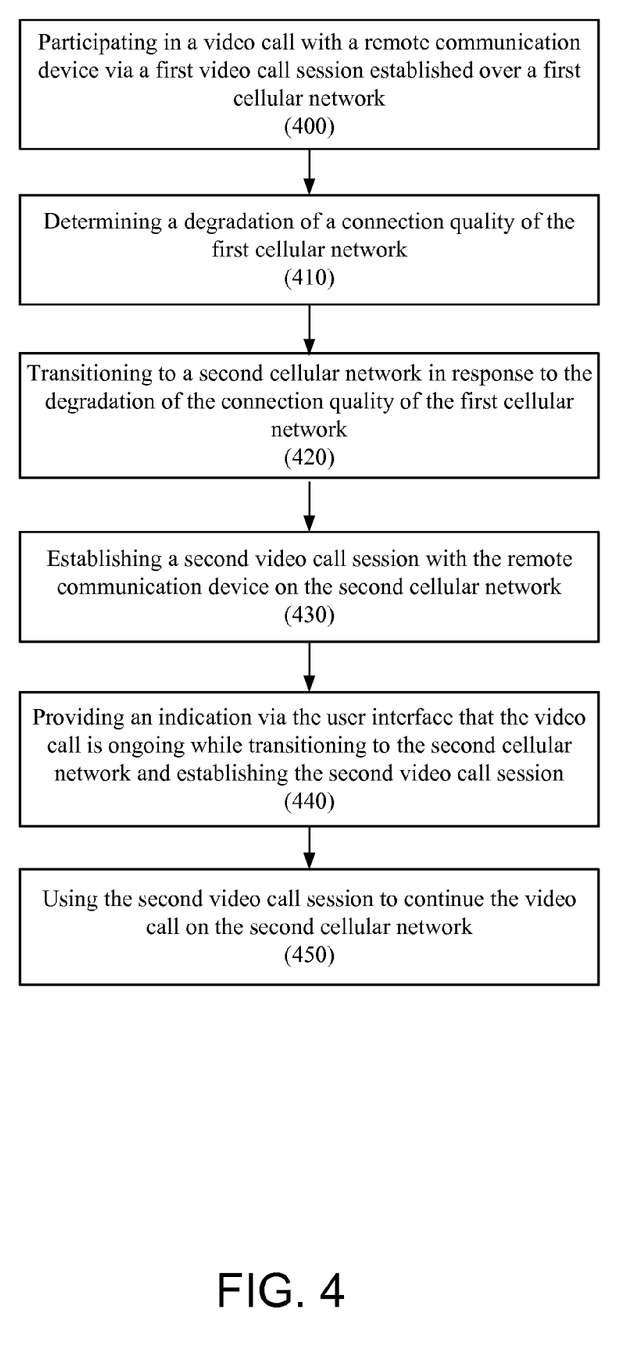
FIG. 4 illustrates a flowchart of operations that can be performed by a wireless communication device in accordance with another example method for transitioning a video call between networks according to some example embodiments.

FIG. 4 illustrates a flowchart of operations that can be performed by a wireless communication device in accordance with another example method for transitioning a video call between networks according to some example embodiments. In this regard, FIG. 4 illustrates application of the methodology illustrated in and described with respect to FIG. 4 to a more generalized cellular network transition. Thus, for example, FIG. 4 can include transitioning between a first LTE network supporting VoLTE and a second network that does not support VoLTE, transitioning from the legacy cellular network 108 to the first cellular network 106, and/or other network transition. One or more of processing circuitry 210, processor 212, memory 214, transceiver(s) 216, user interface 218, or video call manager 220 can, for example, provide means for performing the operations illustrated in and described with respect to FIG. 4.

Operation 400 can include a wireless communication device, such as wireless communication device 102, participating in a video call with participating in a video call with a remote communication device via a first video call session established over a first cellular network. In this regard, operation 400 can correspond to a generalized embodiment of operation 300. The type of bearer arrangement that may be used for the video call can vary depending on a radio access technology (RAT) and/or other configuration of the cellular network.

Operation 410 can include the wireless communication device determining a degradation of a connection quality of the first cellular network. As discussed with respect to operation 310, determination of the degradation maybe based on a measurement(s) of the first cellular network. In some embodiments, determination of the degradation may include determining that a measured connection quality is less than a threshold connection quality, such as can be defined for measurement event reporting, reselection, handover, and/or other action that may trigger a wireless communication device to transition between networks.

The wireless communication device 102 and/or the first cellular network 106 can decide to transition the wireless communication device 102 to the legacy cellular network 108 in response to the degradation of the connection quality of the first cellular network 106. Operation 320 can accordingly include the wireless communication device 102 transitioning to the legacy cellular network 108 in response to the degradation in connection quality.

Operation 420 can include the wireless communication device transitioning to the second cellular network in response to the degradation of the connection quality of the first cellular network. The first cellular network and/or second cellular network may not support a mechanism for handing over the video call. For example, in instances in which the first cellular network is an LTE network supporting VoLTE, the second cellular network is an LTE network that does not support VoLTE, and an audio stream for the video call on the first cellular network is a VoLTE audio stream, transition of the video call to the second cellular network may not be supported by the first cellular network and/or the second cellular network. Accordingly, the first video call session can be dropped as a result of the network transition. As such, the methodology of FIG. 3 may be used to establish a second video call session as a data call carrying both video and audio for the video call on the LTE network that does not support VoLTE.

Operation 430 can include the wireless communication device establishing (e.g., automatically in the background) a second video call session with the remote communication device on the second cellular network. As illustrated by operation 440, the wireless communication device can provide an indication via the user interface that the video call is ongoing while transitioning to the second cellular network and establishing the second video call session. Accordingly, while the user may notice a brief interruption in the video call, the user may not be aware of a call drop, and does not have to take action to proactively reestablish the video call following network transition. Operation 450 can include the wireless communication device using the second video call session to continue the video call on the second cellular network.

Figure 5:
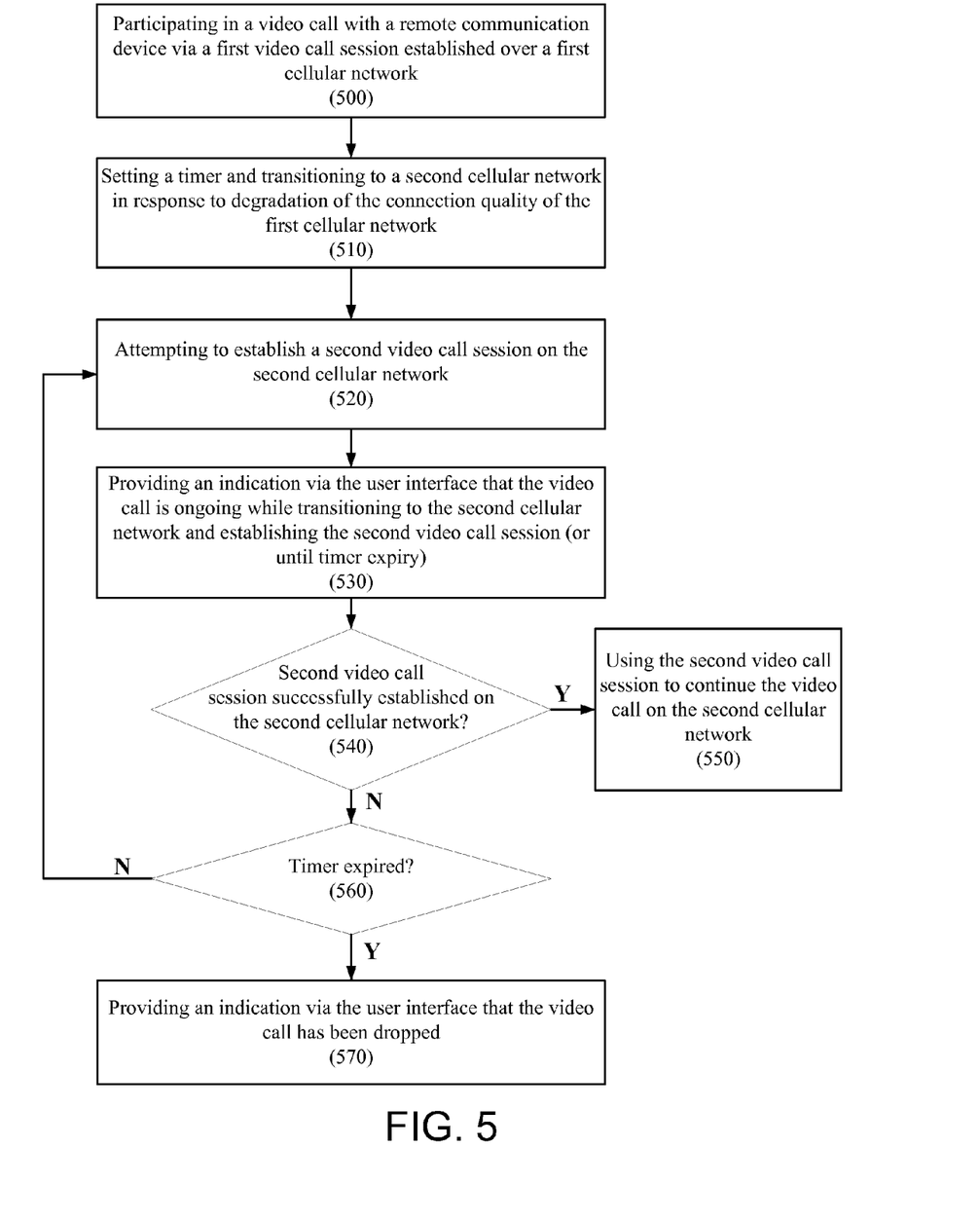
FIG. 5 illustrates a flowchart of operations that can be performed by a wireless communication device in accordance with an example method for controlling user interface indications when transitioning a video call according to some example embodiments.

FIG. 5 illustrates a flowchart of operations that can be performed by a wireless communication device, such as wireless communication device 102, in accordance with an example method for controlling user interface indications when transitioning a video call according to some example embodiments. More particularly, FIG. 5 illustrates an example of some embodiments of the methods of FIGS. 3 and 4 in which a guard timer can be used. One or more of processing circuitry 210, processor 212, memory 214, transceiver(s) 216, user interface 218, or video call manager 220 can, for example, provide means for performing the operations illustrated in and described with respect to FIG. 5.

Operation 500 can include the wireless communication device participating in a video call with a remote communication device via a first video call session established over a first cellular network. In this regard, operation 500 can, for example, correspond to an embodiment of operation 300 and/or operation 400.

The wireless communication device can determine a degradation of the connection quality of the first cellular network, such as described with respect to operations 310 and 410. Operation 510 can, in turn, include the wireless communication device setting a timer and transitioning to a second cellular network in response to degradation of the connection quality of the first cellular network. The first video call session can be dropped as a result of the network transition.

Operation 520 can include the wireless communication device attempting to establish (e.g., automatically in the background) a second video call session with the remote communication device on the second cellular network.

Operation 530 can include the wireless communication device providing an indication via the user interface that the video call is ongoing while transitioning to the second cellular network and establishing the second video call session. In this regard, operation 530 can, for example, correspond to an embodiment of operation 340 and/or operation 440.

Operation 540 can include the wireless communication device determining if the second video call session has been successfully established on the second cellular network. In an instance in which the second video call session has been successfully established, the method can proceed to operation 550, which can include using the second video call session to continue the video call on the second cellular network, and the method can terminate. In this regard, operation 550 can, for example, correspond to an embodiment of operation 350 and/or operation 450.

If, however, the second video call session has not been successfully established, the method can instead proceed to operation 560, which can include determining if the timer set in operation 510 has expired. If the timer has not expired, the wireless communication device can continue to attempt to establish the second video call session (operation 520) and provide an indication via the user interface that the video call is ongoing (operation 530) until the second video call session is successfully established or until the timer expires. If it is determined at operation 560 that the timer has expired, the method can proceed to operation 570, which can include the wireless communication device providing an indication via the user interface that the video call has been dropped.

Figure 6:
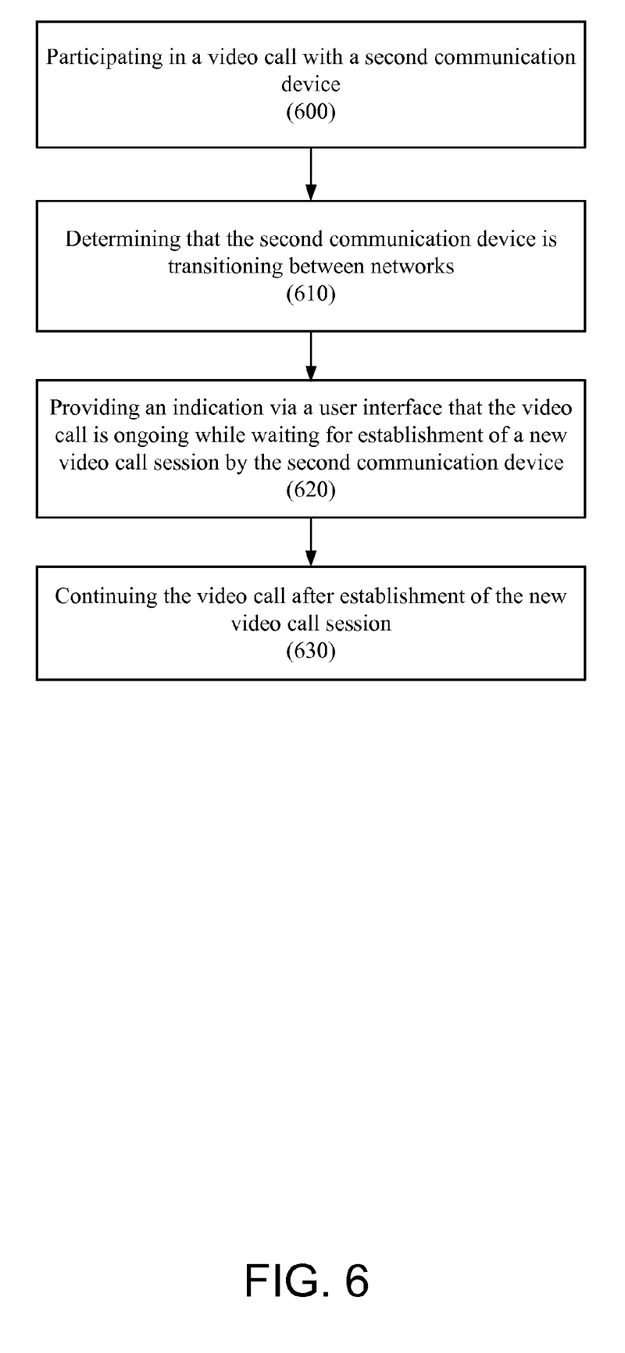
FIG. 6 illustrates a flowchart of operations that can be performed by a communication device in response to another device transitioning between networks during a video call according to some example embodiments.

FIG. 6 illustrates a flowchart of operations that can be performed by a communication device, such as remote communication device 104, in response to another device, such as wireless communication device 102, transitioning between networks during a video call according to some example embodiments. In this regard, FIG. 6 illustrates operations that can be performed by a communication device participating in a video call with wireless communication device 102 when wireless communication device 102 performs one or more of the methods of FIGS. 3-5 in accordance with some example embodiments.

Operation 600 can include a first communication device participating in a video call with a second communication device. Operation 610 can include the first communication device determining that the second communication device is transitioning between networks. For example, in some embodiments, the second communication device can send an indication that it is transitioning between networks. As another example, in some embodiments, if the air interface is dropped and/or there is another interruption in the video call without interruption in the network connection of the first communication device, the first communication device can be configured to assume for at least a guard period of time that the interruption is due to a network transition by the second communication device.

Operation 620 can include the first communication device providing an indication via the user interface that the video call is ongoing while waiting for establishment of a new video call session by the second communication device. Operation 630 can include the first communication device continuing the video call after establishment of the new video call session. Accordingly, while a user of the first communication device may notice brief interruption in the video call, the user may not be aware of a call drop. However, in embodiments in which the first communication device implements a guard timer, if the new video call session is not established before expiry of the timer, the first communication device may provide an indication that the video call has been dropped.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for maintaining continuity of a video call, the method comprising:
   by an apparatus of a wireless communication device:
      participating in a video call with a remote communication device via a first video call session established over a first connection between the wireless communication device and the first wireless network; and in response to determining that a measured quality of the first connection does not satisfy a connection quality threshold:
attempting to establish a second video call session over a second connection between the wireless communication device and a second wireless network; and
when successfully establishing the second video call session:
transitioning the video call to the second wireless network by at least dropping the first connection between the wireless communication device and the first wireless network; and
continuing the video call with the remote communication device via the second video call session on the second wireless network,
wherein the first wireless network and/or the second wireless network do not support a network coordinated handover of the video call.

2. The method of claim 1, further comprising the apparatus sending an indication to the remote communication device that the wireless communication device is transitioning between wireless networks prior to transitioning to the second wireless network.

3. The method of claim 1, further comprising the apparatus providing an indication via a user interface of the wireless communication device that the video call is ongoing while transitioning to the second wireless network and/or while attempting to establish the second video call session.

4. The method of claim 1, further comprising the apparatus:
setting a timer in response to determining that the measured quality of the first connection does not satisfy the connection quality threshold; and
providing an indication, via a user interface of the wireless communication device, that the video call has been dropped when not successfully establishing the second video call session and expiry of the timer occurs.

5. The method of claim 1, wherein the first wireless network comprises a wireless cellular network and the second wireless network comprises at least in part a wireless local area network.

6. The method of claim 1, wherein the first wireless network comprises a Long Term Evolution (LTE) wireless network and the second wireless network comprises a non-LTE wireless network.

7. The method of claim 1, wherein the measured quality of the connection comprises one or more of a received signal strength indicator (RSSI), a reference signal received power (RSRP), or a reference signal received quality (RSRQ).

8. An apparatus comprising:
processing circuitry configured to control a wireless communication device to at least:
participate in a video call with a remote communication device via a first video call session established over a first connection between the wireless communication device and a first wireless network;
in response to determining a degradation in a quality of the first connection:
attempt to establish a second video call session over a second connection between the wireless communication device and a second wireless network; and
when successfully establishing the second video call session:
transition the video call to the second wireless network by at least dropping the connection between the wireless communication device and the first wireless network; and
continue the video call with the remote communication device via the second video call session on the second wireless network,
wherein the first wireless network and/or the second wireless network do not support a network coordinated handover of the video call.

9. The apparatus of claim 8, wherein the first wireless network is a Long Term Evolution (LTE) wireless network, and the second wireless network is a non-LTE wireless network.

10. The apparatus of claim 8, wherein the processing circuitry is further configured to control the wireless communication device to determine the degradation in the quality of the connection at least in part by controlling the wireless communication device to determine that a measured quality of the connection does not satisfy a connection quality threshold.

11. The apparatus of claim 8, wherein the processing circuitry is further configured to control the wireless communication device to send an indication to the remote communication device that the wireless communication device is transitioning between wireless networks prior to transitioning to the second wireless network.

12. The apparatus of claim 8, wherein the processing circuitry is further configured to control the wireless communication device to:
set a timer in response to the degradation in the quality of the first connection; and
provide an indication, via a user interface of the wireless communication device, that the video call with the remote communication device has been dropped when not successfully establishing the second video call session and expiry of the timer occurs.

13. The apparatus of claim 8, wherein the first wireless network does not support transferring a packet switched audio stream of the first video call session to the second wireless network.

14. A non-transitory computer readable storage medium storing instructions that, when executed by one or more processors of a wireless communication device, cause the wireless communication device to perform a method comprising:
participating in a video call with a remote communication device via a first video call session established over a first connection between the wireless communication device and a first wireless network; and
in response to determining a degradation in a quality of the first connection:
attempting to establish a second video call session over a second connection between the wireless communication device and a second wireless network; and
when successfully establishing the second video call session:
transitioning the video call to the second wireless network by at least dropping the first connection between the wireless communication device and the first wireless network; and
continuing the video call with the remote communication device via the second video call session on the second wireless network,
wherein the first wireless network and/or the second wireless network do not support a network coordinated handover of the video call.

15. The non-transitory computer readable storage medium of claim 14, wherein the first video call session comprises a packet switched video stream carried over a first bearer and a packet switched audio stream carried over a second bearer, and wherein the second wireless network comprises a circuit switched domain.

16. The non-transitory computer readable storage medium of claim 15, wherein the first wireless network comprises a Long Term Evolution (LTE) network, and wherein the second bearer comprises a voice over LTE (VoLTE) bearer.

17. The non-transitory computer readable storage medium of claim 14, wherein:
the first wireless network comprises a Long Term Evolution (LTE) network supporting voice over LTE (VoLTE);
the first video call session comprises a packet switched video stream carried over a first bearer and a VoLTE audio stream carried over a second bearer; and
the second wireless network comprises an LTE network that does not support VoLTE.

18. The non-transitory computer readable storage medium of claim 14, wherein the method further comprises:
sending an indication to the remote communication device that the wireless communication device is transitioning between networks prior to transitioning to the second wireless network.

19. The non-transitory computer readable storage medium of claim 14, wherein the method further comprises:
setting a timer in response to the degradation in the quality of the first connection; and
providing an indication via a user interface of the wireless communication device that the video call with the remote communication device has been dropped when not successfully establishing the second video call session and expiry of the timer occurs.

20. The non-transitory computer readable storage medium of claim 14, wherein the first wireless network comprises a wireless cellular network and the second wireless network comprises at least in part a wireless local area network.

* * * * *